US011091725B2

(12) United States Patent
Herr et al.

(10) Patent No.: US 11,091,725 B2
(45) Date of Patent: Aug. 17, 2021

(54) METHOD OF CLEANING RESIDUAL PESTICIDE FROM AN AGRICULTURAL VESSEL

(71) Applicant: Monsanto Technology LLC, St. Louis, MO (US)

(72) Inventors: Amanda C. Herr, St. Louis, MO (US); David A. Morgenstern, St. Louis, MO (US); James W. Taylor, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 16/442,710

(22) Filed: Jun. 17, 2019

(65) Prior Publication Data

US 2019/0367846 A1    Dec. 5, 2019

Related U.S. Application Data

(63) Continuation of application No. 15/486,770, filed on Apr. 13, 2017, now abandoned, which is a continuation of application No. 14/398,305, filed as application No. PCT/US2013/038660 on Apr. 29, 2013, now Pat. No. 9,657,258.

(60) Provisional application No. 61/640,999, filed on May 1, 2012, provisional application No. 61/724,054, filed on Nov. 8, 2012.

(51) Int. Cl.
| | |
|---|---|
| *C11D 11/04* | (2006.01) |
| *C11D 11/00* | (2006.01) |
| *C11D 7/06* | (2006.01) |
| *C11D 7/10* | (2006.01) |
| *B08B 9/08* | (2006.01) |
| *C11D 7/04* | (2006.01) |

(52) U.S. Cl.
CPC ............ *C11D 11/0041* (2013.01); *B08B 9/08* (2013.01); *C11D 7/04* (2013.01); *C11D 7/06* (2013.01); *C11D 7/10* (2013.01)

(58) Field of Classification Search
CPC ............ C11D 11/0005; C11D 11/0041; C11D 11/0011; C11D 11/04; C11D 3/3951; C11D 3/3956; C11D 7/10
See application file for complete search history.

(56) References Cited

U.S. PATENT DOCUMENTS

| | | | | |
|---|---|---|---|---|
| 3,954,645 A | * | 5/1976 | Otrhalek | C23G 1/02 134/3 |
| 5,232,484 A | * | 8/1993 | Pignatello | A62D 3/17 210/739 |
| 5,725,678 A | * | 3/1998 | Cannon | B08B 3/08 134/1 |
| 9,657,258 B2 | * | 5/2017 | Herr | B08B 9/08 |
| 2003/0077983 A1 | * | 4/2003 | Hagan | C03C 15/00 451/37 |
| 2011/0031185 A1 | | 2/2011 | Boulos et al. | |

FOREIGN PATENT DOCUMENTS

| | | |
|---|---|---|
| EP | 0593894 A1 | 6/1993 |
| EP | 0603533 A1 | 6/1994 |
| FR | 2689492 A1 | 10/1993 |
| JP | 2009255078 A | 11/2009 |
| WO | 9316596 A1 | 9/1993 |

OTHER PUBLICATIONS

International Search Report, PCT/US2013/038660, dated Sep. 27, 2013, 5 pages.
Written Opinion, PCT/US2013/038660, dated Sep. 27, 2013, 6 pages.
Brillas et al., "Electrochemical degradation of chlorophenoxy and chlorobenzoic herbicides in acidic aqueous medium by the peroxi-coagulation method", Chemosphere (2003), 51(4), 227-235.
Brillas et al., "Mineralization of herbicide 3,6-dichloro-2-methoxybenzoic acid in aqueous medium by anodic oxidation, electro-Fenton and photoelectro-Fenton", ELECTROCHIMICA ACTA (2003), 48(12), 1697-1705.
Ijpelaar et al., "Advanced oxidation technologies for the degradation of pesticides in ground water and surface water", Water Science & Technology: Water Supply (2002), 2(1), 129-138.
Ijpelaar et al., "Fenton process for the combined removal of iron and organic micropollutants in groundwater treatment", Water Science & Technology: Water Supply (2002), 2(2), 229-236.
Huston et al, "Degradation of selected pesticide active ingredients and commercial formulations in water by the photo-assisted Fenton reaction", Water Research (1999), 33(5), 1238-1246.
Chu et al., "The photocatalytic degradation of dicamba in TiO2 suspensions with the help of hydrogen peroxide by different near UV irradiations", Water Research (2004) 38, 1037-1043.
Pignatello et al., "Advanced Oxidation Processes for Organic Contaminant Destruction Based on the Fenton Reaction and Related Chemistry", Critical Reviews in Environmental Science and Technology, 2006, 36:1, pp. 1-84, 2006.

(Continued)

*Primary Examiner* — Charles I Boyer
(74) *Attorney, Agent, or Firm* — Stinson LLP; Erin C. Robert

(57) ABSTRACT

The present invention generally relates to methods of cleaning residual pesticide from an agricultural vessel, and to kits and compositions useful for the practice of such methods.

25 Claims, 3 Drawing Sheets

(56) References Cited

OTHER PUBLICATIONS

K. Barbusinski, "Fenton reaction-controversy concerning the chemistry", Ecological Chemistry and Engineering S, 2009, vol. 16, No. 3, pp. 347-358.
Huston et al., "Degradation of selected pesticide active ingredients and commercial formulations in water by the photo-assisted Fenton reaction", Wat. Res., 1999, vol. 33, No. 5, pp. 1238-1246.
Cesaro, A. et al., "Wastewater Treatment by Combination of Advanced Oxidation Processes and Conventional Biological Systems," 2013, J Bioremed Biodeg, 4:8, 8 pages.
Jönsson, J., et al., "Removal and Degradation of Glyphosate in Water Traetment: A Review," 2013, Journal of Water Supply: Research and Technology—AQUA, IWA Publishing, 62.7:395-408.
Pignatello, J.J., "Dark and Photoassisted $Fe^{3+}$-Catalyzed Degradation of Chlorophenoxy Herbicides by Hydrogen Peroxide," 1992, Environ. Sci. Technol.92, 26:44-951.

* cited by examiner

METHOD OF CLEANING RESIDUAL PESTICIDE FROM AN AGRICULTURAL VESSEL

REFERENCE TO RELATED APPLICATIONS

This application is a continuation of U.S. patent application Ser. No. 15/486,770, filed Apr. 13, 2017, which is a continuation of U.S. patent application Ser. No. 14/398,305, filed Oct. 31, 2014, now U.S. Pat. No. 9,657,258, issued May 23, 2017, which is the United States National Stage Application of International PCT Application No. PCT/US2013/38660, filed Apr. 29, 2013, which claims the benefit of U.S. Provisional Application Ser. No. 61/640,999, filed May 1, 2012, and U.S. Provisional Patent Application Ser. No. 61/724,054, filed Nov. 8, 2012, the entire disclosures of which are herein incorporated by reference.

FIELD OF THE INVENTION

The present invention generally relates to methods of cleaning residual pesticide from an agricultural vessel, and to kits and compositions useful for the practice of such methods.

BACKGROUND OF THE INVENTION

Auxin herbicides, such as 2,4-D and dicamba, are highly effective for the control of broadleaf weeds, particularly weeds that have become resistant to glyphosate. Dicamba, for example, causes significant damage to plants even at extremely low application levels.

When a pesticidal composition is sprayed, a residual amount of the active pesticidal agent typically remains in the tank. This pesticidal residue, if left untreated, can pose a significant problem for farmers by unintentionally damaging crops and desirable plants. As a result, special precautions must be taken to prepare spray tanks for subsequent use following the application of pesticides. This problem is particularly acute for auxin herbicides, such as dicamba, where even small amounts of herbicidal residue could result in significant damage to sensitive crop plants.

Due to the high potency of dicamba, three full rinses of the spray tank are traditionally required to ensure zero crop damage from the residue. Typical cleaning methods require the cleaning rinse to stand in the spray tank for at least four hours, and preferably should be allowed to soak overnight. This process, although effective, is both expensive and cumbersome. The rinses require additional water in the field, and the long soaking period reduces the time that the equipment is available for spraying crops.

An alternative method of degrading pesticidal residue in the field, which reduces the water use and time required for the farmer to switch to another pesticide, is therefore highly desirable.

SUMMARY OF THE INVENTION

Briefly, therefore, the present invention is directed to methods of preparing a tank for use in connection with a second pesticide following use of the tank in connection with a first pesticide. In various embodiments, the first pesticide is an herbicide. The first and second pesticides may be the same pesticide (e.g., dicamba). In various embodiments, the method comprises introducing a cleaning mixture into a tank containing a residual amount of a first pesticide; the cleaning mixture comprises (a) a source of transition metal ions, and (b) a source of hydrogen peroxide. Optionally, the cleaning solution may further comprise water. The method further comprises allowing the cleaning mixture to remain in the tank for a time sufficient to degrade at least a portion of the residual amount of the first pesticide, thereby forming a waste mixture comprising degradation products of the first pesticide; and removing the waste mixture from the tank.

The present invention is further directed to kits for use in cleaning a tank following the use of the tank in connection with a pesticide. Generally, the kits comprise a source of hydrogen peroxide and a source of transition metal ions.

In preferred embodiments of the present invention, the transition metal ions are polyvalent iron ions.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENTS

Figure 1:
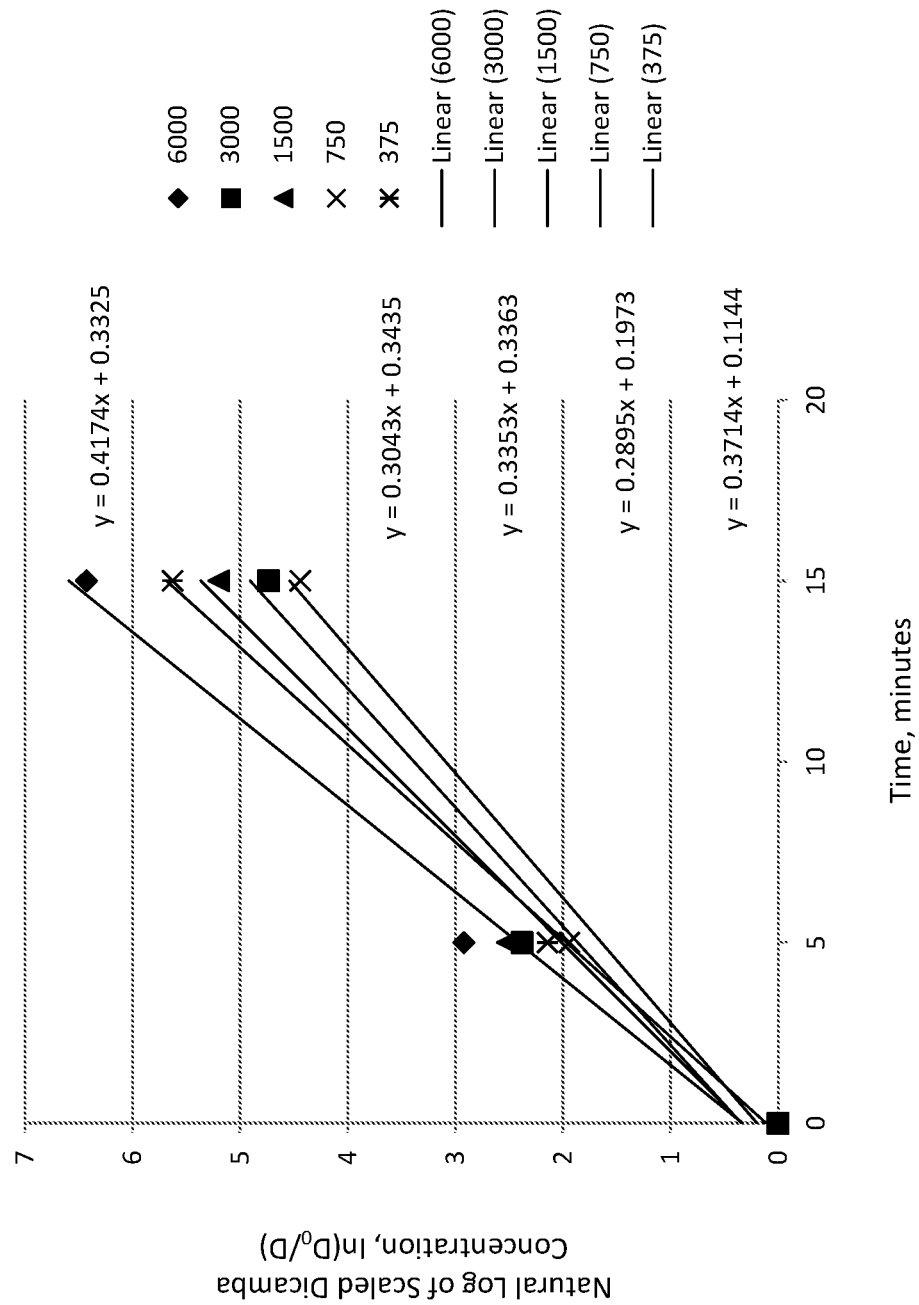
FIG. 1 is directed to the expected concentration of dicamba with respect to time on a logarithmic scale as described in Example 5.

In accordance with the present invention, it has been discovered that the Fenton reaction may be utilized to provide an economical and effective means of degrading residual pesticides (e.g., herbicides) in agricultural vessels (e.g., spray tanks).

In the Fenton reaction, in which a source of iron ions is utilized, ferrous iron ions are oxidized by hydrogen peroxide to produce hydroxyl radicals:

$$Fe^{2+}+H_2O_2 \rightarrow Fe^{3+}+OH^-+OH— \quad (1)$$

A second reaction, in which the iron (III) product compound is reduced in the presence of hydrogen peroxide, makes the Fenton reaction catalytic with respect to iron:

$$Fe^{3+}+H_2O_2 \rightarrow Fe^{2+}+H^++HOO— \quad (2)$$

In most environments, reaction (2) is several orders of magnitude slower than reaction (1), and thus becomes the rate-limiting step where an excess of $H_2O_2$ is present.

More generally, other transition metals have also been observed to catalyze reactions similar to the Fenton reaction, wherein transition metal ions react with hydrogen peroxide to produce hydroxyl radicals. For example, the transition metal may be selected from the group consisting of copper, vanadium, chromium, molybdenum, tungsten, manganese, cobalt, nickel, cerium, ruthenium, aluminum, antimony, zinc, titanium, tin, barium, and combinations thereof. Preferably, the transition metal ions are polyvalent. Cobalt is an example of a transition metal known to engage in a Fenton-like reaction with hydrogen peroxide. Accordingly, although the methods, compositions, and kits described herein are described primarily with respect to the traditional Fenton reaction, which involves polyvalent iron ions as the metal catalyst, one skilled in the art would understand that the present invention encompasses the use of other transition metals as described above.

When hydroxyl radicals are produced in the presence of a pesticide, the pesticide is degraded into reaction products that do not retain pesticidal activity. Surprisingly, it has been discovered that this reaction may be incorporated into an improved process for cleaning pesticidal residue from spray tanks that provides a high level of effectiveness and requires significantly less cleaning time than traditional rinses. The result is a convenient and inexpensive solution that is beneficial for both farmers and custom applicators. In particular, the methods of the present invention are suitable for in-field applications and also are more rapid than conventional tank cleaning methods. For example, as detailed elsewhere herein, the methods of the present invention are suitable for tank cleaning that occurs over a period of no more than 30 minutes and, in various preferred embodiments, methods that occur over a shorter period of time (e.g., less than about 10 minutes, or even less than about 5 minutes).

Generally, the method involves the preparation of an aqueous cleaning mixture comprising a source of transition metal ions (e.g., polyvalent iron ions) and a source of hydrogen peroxide. The cleaning mixture is introduced into a tank containing a residual amount of the pesticide, and is allowed to remain in the tank for a time sufficient to substantially degrade the pesticidal residue. As used herein, "degradation" refers to the process whereby the pesticide decomposes into reaction products that do not retain pesticidal activity.

Optionally, the present method may incorporate a pre-rinse step, wherein an amount of an aqueous medium (e.g., water) is introduced into the tank prior to the cleaning step. The pre-rinse step is useful to reduce any excessive pesticidal residue that may be present in the tank, thereby decreasing the total amount of pesticide that remains to be degraded by the cleaning solution. The waste product formed by the pre-rinse step, referred to herein as a diluted pesticidal residue mixture, comprises a portion of the residual first pesticide. Typically, at least a portion of the diluted pesticidal residue mixture is removed from the tank (e.g., by spraying) prior to introduction of the cleaning mixture into the tank.

Typically, the aqueous medium (e.g., rinse water) is introduced into the tank in a volumetric ratio, with respect to the pesticidal residue at a typical pesticidal concentration, of at least about 1:1, at least about 2:1, at least about 5:1, at least about 10:1, at least about 20:1, or at least about 50:1.

Generally, the amount of pesticide remaining in the tank and any appurtenant apparatus (e.g., spray lines, pumps, etc.) can be reliably estimated by one skilled in the art based on the size and shape of the tank, the spray apparatus, and the concentration of the first pesticide mixture. In most cases, the amount of dead volume present in a spray tank, and in any equipment connected thereto (e.g., a boom spray apparatus), will be known to the skilled worker and/or the equipment manufacturer, and may be used to obtain a reasonably accurate estimate of the amount of pesticidal residue remaining therein. Once the amount of pesticidal residue remaining in the tank is estimated, appropriate amounts of the sources of transition metal ions and hydrogen peroxide forming the cleaning mixture can be selected for introduction into the tank. More particularly, appropriate molar ratios of hydrogen peroxide to pesticidal residue and to the transition metal ions are disclosed below and can be used to determine appropriate quantities of the sources of hydrogen peroxide and transition metal ions to form the cleaning mixture.

Where the spray tank is a component of a larger system, for example a boom spray system, the cleaning mixture can also be used to clean the hoses, pumps, and spray nozzles incorporated therein. Typically, water may be added to the cleaning mixture in an amount sufficient to allow the cleaning mixture to recirculate through the system (e.g., the boom spray system). The volume of liquid necessary for effective recirculation is dependent on the particular equipment to be cleaned, and can be reliably determined by one skilled in the art.

Generally, the amount of water incorporated into the cleaning mixture will correspond to the amount necessary to effectively recirculate the mixture through the system, as described above. This water may be provided by the source of transition metal ions, source of hydrogen peroxide, and/or as additional water added along with the source of transition metal ions and source of hydrogen peroxide. Typically, water constitutes at least about 50%, at least about 60%, at least about 70%, at least about 80%, at least about 90%, at least about 95%, at least about 98%, or at least about 99% by mass of the cleaning mixture.

After the pesticidal residue has been degraded, a waste mixture comprising degradation products of the first pesticide is formed, which should be removed from the tank. Typically, the waste mixture is removed from the tank by spraying. Generally, a final water rinse following the addition of the cleaning mixture is not required.

A significant advantage of the present invention, as compared to the prior art, is that the present methods may be performed in a relatively brief amount of time. More particularly, it has been surprisingly discovered that Fenton-type chemistry is effective for degradation of pesticidal residues over time scales such that tank cleaning methods incorporating Fenton chemistry are dramatically shorter than the tank cleaning methods typically employed in the prior art. For example, the duration between introduction of the cleaning mixture into the tank and removal of the waste mixture from the tank is typically less than about 2 hours. Depending on the concentration of iron ions and hydrogen peroxide in the cleaning mixture, and the amount of pesticidal residue in the tank, the duration may be less than about 1 hour, less than about 1 hour, less than about 30 minutes, less than about 25 minutes, less than about 20 minutes, less than about 15 minutes, less than about 10 minutes, or even less than about 5 minutes.

In most cases, at least about 50% by weight, at least about 60% by weight, at least about 70% by weight, at least about 80% by weight, at least about 90% by weight, at least about 95%, or at least about 99% by weight of the pesticidal residue is degraded prior to removal of the waste mixture from the tank.

In various embodiments, a pre-rinse step is not incorporated and the method proceeds over a duration of no more than about 30 minutes. That is, the waste mixture is removed from the tank (e.g., by spraying) within no more than about 30 minutes of introduction of the cleaning mixture into the tank (e.g., within no more than about 15 minutes or no more than about 5 minutes). Further in accordance with such embodiments, suitable degradation of the pesticidal residue (e.g., at least about 70% or at least about 80% by weight) is achieved during such methods.

The method may generally be used to degrade various pesticides known in the art. Typically, the first pesticide comprises one or more first herbicides. Non-limiting examples of water-soluble herbicides that may be degraded using the present methods include acifluorfen, acrolein, amitrole, asulam, benazolin, bentazon, bialaphos, bromacil, bromoxynil, chlorambenc, chloroacetic acid, clopyralid, 2,4-D, 2,4-DB, dalapon, dicamba, dichlorprop, difenzoquat, endothall, fenac, fenoxaprop, flamprop, flumiclorac, flumioxazin, fluoroglycofen, flupropanate, fomesafen, fosamine, fluroxypyr, glufosinate, glyphosate, imazameth, imazamethabenz, imazamox, imazapic, imazapyr, imazaquin, imazethapyr, ioxynil, MCPA, MCPB, mecoprop, methylarsonic acid, naptalam, nonanoic acid, picloram, quinclorac, sulfamic acid, 2,3,6-TBA, TCA, triclopyr and water-soluble salts or esters thereof.

Non-limiting examples of water-insoluble herbicides that may be degraded using the present methods include acetochlor, aclonifen, alachlor, ametryn, amidosulfuron, anilofos, atrazine, azafenidin, azimsulfuron, benfluralin, benfuresate, bensulfuron-methyl, bensulide, benzfendizone, benzofenap, bromobutide, bromofenoxim, butachlor, butafenacil, butamifos, butralin, butroxydim, butylate, cafenstrole, carfentrazone-ethyl, carbetamide, chlorbromuron, chloridazon, chlorimuron-ethyl, chlorotoluron, chlornitrofen, chlorotoluron, chlorpropham, chlorsulfuron, chlorthal-dimethyl, chlorthiamid, cinidon-ethyl, cinmethylin, cinosulfuron, clethodim, clodinafop-propargyl, clomazone, clomeprop, cloransulam-methyl, cyanazine, cycloate, cyclosulfamuron, cycloxydim, cyhalofop-butyl, daimuron, desmedipham, desmetryn, dichlobenil, diclofop-methyl, diflufenican, dimefuron, dimepiperate, dimethachlor, dimethametryn, dimethenamid, dinitramine, dinoterb, diphenamid, dithiopyr, diuron, EPTC, esprocarb, ethalfluralin, ethametsulfuron-methyl, ethofumesate, ethoxysulfuron, etobenzanid, fenoxaprop-ethyl, fenuron, flamprop-methyl, flazasulfuron, fluazifop-butyl, fluazifop-P-butyl, fluazoate, fluchloralin, flumetsulam, flumiclorac-pentyl, flumioxazin, fluometuron, fluorochloridone, flupoxam, flurenol, fluridone, fluroxypyr-I-methylheptyl, flurtamone, fluthiacet-methyl, graminicides, halosulfuron, haloxyfop, hexazinone, imazosulfuron, indanofan, isoproturon, isouron, isoxaben, isoxaflutole, isoxapyrifop, lenacil, linuron, mefenacet, metamitron, metazachlor, methabenzthiazuron, methyldymron, metobenzuron, metobromuron, metolachlor, S-metolachlor, metosulam, metoxuron, metribuzin, metsulfuron, molinate, monolinuron, naproanilide, napropamide, neburon, nicosulfuron, norflurazon, orbencarb, oryzalin, oxadiargyl, oxadiazon, oxasulfuron, pebulate, pendimethalin, pentanochlor, pentoxazone, phenmedipham, piperophos, pretilachlor, primisulfuron, prodiamine, profluazol, prometon, prometryn, propachlor, propanil, propaquizafop, propazine, propham, propisochlor, propyzamide, prosulfocarb, prosulfuron, pyraflufen-ethyl, pyrazogyl, pyrazolynate, pyrazosulfuron-ethyl, pyrazoxyfen, pyri buticarb, pyridate, pyriminobac-methyl, quinclorac, quinmerac, quizalofop, quizalofop-P, rimsulfuron, sethoxydim, siduron, simazine, simetryn, sulcotrione, sulfentrazone, sulfometuron, sulfosulfuron, tebutam, tebuthiuron, tepraloxydim, terbacil, terbumeton, terbuthylazine, terbutryn, thenylchlor, thiazopyr, thidiazimin, thifensulfuron, thiobencarb, tiocarbazil, tralkoxydim, triallate, triasulfuron, tribenuron, trietazine, trifluralin, triflusulfuron and vernolate.

Preferably, the present method is effective to degrade the residue of auxin herbicides. Exemplary auxin herbicides include 2,4-dichlorophenoxyacetic acid (2,4-D), 4-(2,4-dichlorophenoxy)butanoic acid (2,4-DB), dichloroprop (4-chloro-2-methylphenoxy)acetic acid (MCPA), 4-(4-chloro-2-methylphenoxy)butanoic acid (MCPB), mecoprop, dicamba, picloram, quinclorac, agriculturally acceptable salts or esters of any of these herbicides, and mixtures thereof.

The present method is particularly effective for the degradation of dicamba and 2,4-D. Without being bound to any particular theory, it is believed that the dominant degradation pathway utilized by the present method involves an attack on the ether linkages present in the dicamba and 2,4-D molecules. High-performance liquid chromatography (HPLC) analysis involving dicamba as described in the working examples herein shows a decrease in the dicamba molecule concentration followed by a corresponding increase in the concentration of 2,4-dichlorosalicylate as a degradation product. In certain embodiments, in addition to dicamba or 2,4-D, the present method is also effective for the degradation of flumioxazin.

The polyvalent iron ions may be derived from any water-soluble compound comprising iron in a +2 or +3 oxidation state. Suitable compounds include ferric ammonium sulfate, ferric chloride, ferric oxide, ferric oxide hydrate, ferric sulfate, ferrous ammonium sulfate, ferrous oxide, ferrous chloride, ferrous sulfate and/or iron salts of di-, tri- or other polycarboxylic acids such as iron citrate. Ferrous sulfate, ferric chloride and iron citrate are preferred sources of iron ions for use with the present method.

Ferrous sulfate is a particularly preferred source of iron ions. Ferrous sulfate dissolves readily in water, and has been found to exhibit favorable reaction kinetics as compared to other sources of polyvalent iron. Additionally, ferrous sulfate does not cause damage to most plastics or stainless steel, materials which are commonly used in pesticidal tanks.

The concentration of transition metal ions in the source of transition metal ions is typically at least about 5 grams per liter (g/L), at least about 7.5 g/L, at least about 10 g/L, at least about 12.5 g/L, at least about 15 g/L, at least about 17.5 g/L, at least about 20 g/L, or at least about 25 g/L.

Aqueous hydrogen peroxide is readily available from commercial suppliers, and is a preferred reagent for use with the present method. Alternatively, the method may utilize one or more compounds that react or dissociate to produce hydrogen peroxide in an aqueous environment. Exemplary reagents of this type include sodium perborate, sodium percarbonate, and other sources of peroxides, such as adducts of urea and peroxide.

Typically, hydrogen peroxide is incorporated into the cleaning mixture in a concentration of at least about 100 grams per liter of cleaning mixture. To reduce cleaning time and increase the rate of pesticidal degradation, a higher concentration of hydrogen peroxide may be incorporated into the cleaning mixture. Typically, the concentration of hydrogen peroxide in the source of hydrogen peroxide is at least about 125 g/L, at least about 150 g/L, at least about 175 g/L, at least about 200 g/L, at least about 225 g/L, or at least about 250 g/L.

In cases where it is possible to accurately estimate the amount of pesticidal residue remaining in the tank, the amount of hydrogen peroxide added to the cleaning mixture may be adjusted accordingly. Typically, the molar ratio of hydrogen peroxide to residual pesticide is at least about 10:1, at least about 25:1, at least about 50:1, at least about 75:1, at least about 100:1, at least about 125:1, or at least about 150:1. Generally, higher hydrogen peroxide to pesticide ratios provide for faster degradation of the pesticidal residue.

In certain embodiments, the molar ratio of hydrogen peroxide to residual pesticide (e.g., first pesticide) is from about 10:1 to about 60:1, from about 10:1 to about 50:1, or from about 10:1 to about 40:1. In other embodiments, the molar ratio of hydrogen peroxide to residual pesticide (e.g., first pesticide) is from about 15:1 to about 35:1, from about 20:1 to about 35:1, or from about 25:1 to about 35:1. In still other embodiments, the molar ratio of hydrogen peroxide to residual pesticide (e.g., first pesticide) is from about 10:1 to about 30:1, or from about 10:1 to about 20:1.

Generally, the relative amounts of the hydrogen peroxide source and the transition metal source are incorporated into the cleaning mixture such that the initial molar ratio of hydrogen peroxide to transition metal ions is from about 500:1 to about 1:1. More typically, the initial molar ratio of hydrogen peroxide to transition metal ions is at least about 5:1, at least about 8:1, at least about 10:1, at least about 12:1, at least about 15:1, at least about 20:1, at least about 25:1, or at least about 50:1 with hydrogen peroxide being in molar excess. As used herein, the term "initial molar ratio" at least refers to the molar ratio of the hydrogen peroxide to transition metal ions at the outset of the cleaning operation (e.g., when the sources of hydrogen peroxide and transition metal ions are combined prior to initiation of the Fenton reaction). This does not, however, exclude the possibility that such molar ratios may persist during the cleaning operation. Typically, the source of hydrogen peroxide will be added to the cleaning mixture in a mass ratio of at least about 0.5:1, at least about 1:1, at least about 2:1, at least about 5:1, or at least about 10:1 as compared to the source of transition metal ions.

Additional considerations may apply when the pesticidal residue comprises a species that chelates or otherwise binds with free metal ions in solution. For example, many phosphate-containing herbicides (e.g., glufosinate) are known to be effective chelators. A particularly notable example of a species known to chelate free metal ions is N-(phosphonomethyl)glycine, commonly referred to as glyphosate.

Glyphosate is a highly effective and commercially important broad spectrum herbicide useful in controlling the growth of germinating seeds, emerging seedlings, maturing and established woody and herbaceous vegetation, and aquatic plants. Glyphosate is used as a post-emergent herbicide to control the growth of a wide variety of annual and perennial grass and broadleaf weed species in cultivated crop lands, including cotton production, and is the active ingredient in the ROUNDUP family of herbicides available from Monsanto Company (Saint Louis, Mo.).

In addition to its herbicidal properties, glyphosate, by virtue of the presence of carboxyl and a phosphonomethyl groups or ligands, can function as a strong complexing agent and can chelate or otherwise bind with free metal ions in solution. In particular, glyphosate has been observed to chelate or bind with polyvalent iron ions, which are preferred for use with the methods described herein. As a consequence, the present methods require more metal ions to be added to the cleaning mixture when glyphosate is present in the herbicidal residue to compensate for this effect.

Frequently, herbicidal glyphosate formulations also contain relatively low concentrations of N-(phosphonomethyl) iminodiacetic acid (PMIDA) and/or salts thereof which are intermediate compounds produced during the glyphosate manufacturing process. Like glyphosate, PMIDA also chelates or binds with metal ions, and therefore also contributes to the requirement of additional transition metal ions added to the cleaning mixture.

For example, it has been observed that when no metal chelation is present (i.e., in the absence of glyphosate), suitable degradation of dicamba residue may occur with very low amounts of metal catalyst in the cleaning mixture (e.g., <1 mM). In the presence of glyphosate, however, herbicidal degradation was only observed with cleaning mixtures having transition metal ion concentrations that provided at least a 1:1 molar ratio of polyvalent iron ions to glyphosate, acid equivalent (a.e.).

Accordingly, when glyphosate is present, the molar ratio of transition metal ions to glyphosate is preferably greater than 1:1. Typically, the ratio is at least about 2:1, at least about 3:1, or at least about 4:1. In certain embodiments, the molar ratio of transition metal ions to glyphosate is from about 1:1 to about 8:1, from about 1:1 to about 6:1, or from about 2:1 to about 4:1.

Generally, the methods of the present invention do not require the use of a pH adjusting agent. Aqueous solutions of iron (II), typically derived from a source such as ferrous sulfate, have been found to be effective without adjustment of pH.

The use of a pH adjusting agent may be desirable, however, when aqueous solutions of iron (III) are employed. At a pH of up to about 2, ferric iron has a strong tendency to hydrolyze to form a binuclear species, $[Fe(H_2O)_4(OH)_2Fe(H_2O)_4]^{4+}$ and at a pH above about 2 to 3 polynuclear Fe—OH species. The latter results in the precipitation of colloidal or hydrous ferric oxide.

The cleaning mixture preferably has a pH of from about 2 to about 4. Sodium hydroxide is typically used to raise the pH, if necessary, while a lower pH is typically achieved through addition of the acidic counterion corresponding to the iron source (e.g., $H_2SO_4$ when ferrous sulfate is used, or HCl when ferric chloride is used). Glyphosate salts, if present in the herbicidal residue, typically act to buffer the system to a pH of approximately 4.

As shown in Equation 1, reproduced below, the Fenton reaction involves the oxidation of ferrous iron ions by hydrogen peroxide to produce hydroxyl radicals:

$$Fe^{2+}+H_2O_2 \rightarrow Fe^{1+}+OH^-+OH— \tag{1}$$

This reaction requires stoichiometric amounts of $Fe^{2+}$ and hydrogen peroxide to produce an equivalent molar quantity of hydroxyl radicals. The Fenton reaction is catalytic, however, to the extent that the iron (III) product compound is reduced in the presence of hydrogen peroxide:

$$Fe^{3+}+H_2O_2 \rightarrow Fe^{2+}+H^++HOO— \tag{2}$$

In the conventional Fenton process, reaction (2) is several orders of magnitude slower than reaction (1), and thus becomes the rate-limiting step in environments where an excess of $H_2O_2$ is present. Alternative pathways for reduction of Fe(III) to Fe(II), however, are known in the art, and are predominantly used in many applications of Fenton chemistry for water or soil treatment.

For example, an alternative version of reaction (2) uses photochemical energy, rather than ambient thermal energy, to reduce the Fe(III) species to Fe(II):

$$Fe^{3+}+H_2O_2 \xrightarrow{hv} Fe^{2+}+H^++HOO— \tag{2B}$$

In this reaction, the $Fe(OH)^{2+}$ ion absorbs light at wavelengths up to about 410 nm, which falls in the near-UV region of the spectrum. The photochemical reduction process including the combined process of reactions (1) and (2B) is generally known as the photo-assisted Fenton (or photo-Fenton) reaction.

Advantageously, the present method has been shown to work without the requirement of UV lighting or other photons to assist the reaction. This is beneficial, in part, because the UV lighting and other equipment required to carry out the photo-Fenton reaction can be fragile, unwieldy, and expensive, particularly when the reaction is scaled up to the level required for the agricultural uses described herein. Experiments were conducted using foil-wrapped containers, wherein the present method was used to degrade herbicidal residue in the absence of UV light. The foil-wrapped container results showed no significant differences in reaction kinetics as compared to equivalent experiments conducted in the presence of UV light. As a result, the present method does not require the cleaning mixture to be subjected to an artificial light source while in the tank. The tank material may be substantially opaque to ultraviolet light. In addition, the present method is suitable for use in large-scale agricultural operations.

As a further alternative to the UV-induced catalysis described above, an applied electric current may be used to reduce the iron (III) species, thereby regenerating the iron ions in solution. Advantageously, the present method does not require the use of electrochemistry, in that it does not require the cleaning mixture to be subjected to an applied electric current while in the tank.

Kits

The present invention is further directed to kits for use in connection with the methods described herein.

Generally, the kit comprises a source of polyvalent iron ions and a source of hydrogen peroxide. The sources of polyvalent iron ions and hydrogen peroxide, respectively, may be selected as described above. The kit may further comprise instructions for carrying out the methods described herein.

Typically, the source of hydrogen peroxide and the source of polyvalent iron ions should be packaged separately, such that they do not interact prior to the formation of the cleaning solution.

Following are Examples presented to illustrate the present invention and are not intended to limit the scope of this invention. The examples will permit better understanding of the invention and perception of its advantages and certain variations of execution.

EXAMPLES

Example 1

An experiment was conducted to measure the reaction kinetics of the present method with respect to dicamba. Ferric chloride ($FeCl_3$) was used as the source of iron. Aqueous hydrogen peroxide (30% w/w) was used as the peroxide source.

An additional sample was prepared with glyphosate to measure the effect of iron chelation on the dicamba degradation process.

Hydrogen peroxide was added to the reaction vessel in a molar ratio of 100:1 with respect to dicamba. In the absence of glyphosate, the results show that the dicamba concentration was degraded to below detectable limits in 24 hours. In the sample containing glyphosate, however, the reaction was effectively stopped due to chelation of the iron species. The results of these trials are summarized in Table 1 below.

TABLE 1

100x Molar Ratio of Hydrogen Peroxide to Dicamba Over 24 Hours

| Sample No. | Ingredients | Dicamba % Change 0-2 Hr. | Dicamba % Change 2-4 Hr. | Dicamba % Change 4-6 Hr. | Dicamba % Change 24 Hr. |
|---|---|---|---|---|---|
| 723-10 | glyphosate/dicamba/$H_2O_2$/$FeCl_3$ | 4% | 4% | 5% | 6% |
| 723-11 | dicamba/$H_2O_2$/$FeCl_3$ | 35% | 58% | 70% | 92% |

Additional trials were conducted to evaluate the effectiveness of sodium percarbonate and OXICLEAN, respectively, as alternative sources of hydrogen peroxide. The results of these trials are summarized in Table 2 below.

TABLE 2

100x Molar Ratio of Hydrogen Peroxide to Dicamba Over 24 Hours

| Sample No. | Ingredients | Dicamba % wt. 24 Hr. | Dicamba % Change 24 Hr. |
|---|---|---|---|
| 723-16 | glyphosate/dicamba/$H_2O_2$/$FeCl_3$ | 0.116 | 7.9% |
| 723-17 | dicamba/$H_2O_2$/$FeCl_3$ | 0.01 | 92% |
| 723-18 | glyphosate/dicamba/$2(Na_2CO_3) \cdot 3(H_2O_2)$/$FeCl_3$ | 0.103 | 18% |
| 723-19 | dicamba/$2(Na_2CO_3) \cdot 3(H_2O_2)$/$FeCl_3$ | 0.122 | 7% |
| 723-20 | glyphosate/dicamba/OXICLEAN/$FeCl_3$ | ND | 100% |
| 723-21 | dicamba/OXICLEAN/$FeCl_3$ | ND | 100% |

Example 2

Additional experiments were conducted to further investigate the effect of varying peroxide levels on the degradation reaction kinetics. Aqueous hydrogen peroxide, sodium percarbonate, and OXICLEAN were each used at 100:1 and 10:1 molar ratios with respect to dicamba, in samples both with and without the presence of glyphosate. Control samples were also prepared with one or more herbicides in the absence of a source of hydrogen peroxide, a source of iron, or both.

The samples were measured after 24 hours to determine the concentration of dicamba remaining in the reaction mixture. The pH of the reaction mixture was also recorded. The results of these trials are summarized in Table 3, below.

TABLE 3

Degradation of Dicamba after 24 Hours

| Sample No. | Herbicide(s) | Iron Source | Hydrogen Peroxide Source | % Change dicamba | pH |
|---|---|---|---|---|---|
| 1435-1 | Dicamba | None | None | 0% | 6.36 |
| 1435-6 | Dicamba | $FeCl_3$ | $H_2O_2$ (100x) | 8% | 3.97 |
| 1435-24 | Dicamba | $FeCl_3$ | $H_2O_2$ (10x) | 100% | 1.84 |
| 1435-12 | Dicamba | $FeCl_3$ | $H_2O$ (100x) | 100% | 1.91 |
| 1435-18 | Dicamba | $FeCl_3$ | $H_2O_2$ (100x) | 100% | 1.86 |
| 1435-20 | Dicamba | $FeCl_3$ | Sodium Percarb. (10x) | 2% | 10.78 |
| 1435-14 | Dicamba | $FeCl_3$ | Sodium Percarb. (100x) | 9% | 11.42 |
| 1435-22 | Dicamba | $FeCl_3$ | OXICLEAN (10x) | 5% | 10.93 |

TABLE 3-continued

Degradation of Dicamba after 24 Hours

| Sample No. | Herbicide(s) | Iron Source | Hydrogen Peroxide Source | % Change dicamba | pH |
|---|---|---|---|---|---|
| 1435-16 | Dicamba | $FeCl_3$ | OXICLEAN (100x) | 100% | 10.82 |
| 1435-7 | Dicamba | None | Sodium Percarb. (100x) | 8% | 11.54 |
| 1435-8 | Dicamba + Glyphosate | None | Sodium Percarb. (100x) | 13% | 10.51 |
| 1435-23 | Dicamba + Glyphosate | $FeCl_3$ | $H_2O_2$ (10x) | 7% | 3.38 |
| 1435-11 | Dicamba + Glyphosate | $FeCl_3$ | $H_2O_2$ (100x) | 12% | 3.3 |
| 1435-17 | Dicamba + Glyphosate | $FeCl_3$ | $H_2O_2$ (100x) | 11% | 3.28 |
| 1435-19 | Dicamba + Glyphosate | $FeCl_3$ | Sodium Percarb. (10x) | 17% | 9.43 |
| 1435-13 | Dicamba + Glyphosate | $FeCl_3$ | Sodium Percarb. (100x) | 25% | 10.63 |
| 1435-21 | Dicamba + Glyphosate | $FeCl_3$ | OXICLEAN (10x) | 13% | 10.32 |
| 1435-15 | Dicamba + Glyphosate | $FeCl_3$ | OXICLEAN (100x) | 100% | 10.84 |
| 1435-2 | Dicamba + Glyphosate | None | None | 0% | 4.29 |
| 1435-10 | Dicamba + Glyphosate | $FeCl_3$ | None | 3% | 3.51 |
| 1435-3 | Dicamba + Glyphosate | None | $H_2O_2$ (100x) | 7% | 4.14 |
| 1435-9 | Dicamba + Glyphosate | None | $H_2O_2$ + Sodium Percarb. (100x) | 17% | 10.45 |
| 1435-5 | Dicamba + Glyphosate | None | OXICLEAN (100x) | 100% | 10.73 |
| 1435-4 | Dicamba + Glyphosate | None | Sodium Percarb. (100x) | 9% | 10.52 |
| 1435-25 | Glyphosate | $FeCl_3$ | Sodium Percarb. (100x) | | 11.12 |

Example 3

An experiment was conducted to investigate whether the chelation effect of glyphosate can be overwhelmed by including additional amounts of iron. Samples were prepared using ferric chloride ($FeCl_3$) and ferrous sulfate ($FeSO_4$), respectively, which were incorporated at molar ratios of 1:1 and 2:1 with respect to glyphosate.

Aqueous hydrogen peroxide (30% w/w) was used as the peroxide source, and was provided in a 100:1 molar ratio with respect to dicamba. A small number of control samples, as shown in the table below, were prepared in the absence of a peroxide source.

For samples comprising both glyphosate and dicamba, the herbicides were present in a molar ratio of 1.5:1, respectively.

The results showed that at both 1:1 and 2:1 molar ratios of iron salt to glyphosate, the dicamba was fully degraded after 24 hours, with the concentration being either not detectable (ND) or detectable but not quantifiable (<5 ppm) (DBNQ).

The results are summarized in Table 4, below. Iron concentration is provided in terms of the molar ratio with respect to glyphosate. Where no glyphosate is present, the concentrations used were either a 1.5:1 molar ratio to dicamba (1x) or a 3:1 molar ratio to dicamba (2x).

TABLE 4

Effect of Iron Concentration on Dicamba Degradation Rate in the Presence of Glyphosate

| Sample No. | Herbicide(s) | Peroxide Conc. | Iron Source | Iron Conc. | Dicamba % 24 Hr. |
|---|---|---|---|---|---|
| 08578911-1 | Dicamba | None | None | — | 0.1021 |
| 08578911-2 | Dicamba + Glyphosate | None | None | — | 0.1044 |
| 08578911-3 | Dicamba | 100x | None | — | 0.0952 |
| 08578911-4 | Dicamba + Glyphosate | 100x | None | — | 0.0981 |
| 08578911-5 | Dicamba + Glyphosate | None | $FeCl_3$ | 1X | 0.0939 |
| 08578911-6 | Dicamba | 100x | $FeCl_3$ | 1X | DBNQ |
| 08578911-7 | Dicamba | 100x | $FeCl_3$ | 2X | 0.0711 |
| 08578911-8 | Dicamba + Glyphosate | 100x | $FeCl_3$ | 1X | DBNQ |
| 08578911-9 | Dicamba + Glyphosate | 100x | $FeCl_3$ | 2X | ND |
| 08578911-10 | Dicamba + Glyphosate | None | $FeSO_4$ | 1X | 0.0924 |
| 08578911-11 | Dicamba | 100x | $FeSO_4$ | 1X | ND |
| 08578911-12 | Dicamba | 100x | $FeSO_4$ | 2X | 0.0972 |
| 08578911-13 | Dicamba + Glyphosate | 100x | $FeSO_4$ | 1X | DBNQ |
| 08578911-14 | Dicamba + Glyphosate | 100x | $FeSO_4$ | 2X | ND |

Example 4

Experiments were conducted using a dicamba/glyphosate tank mix formulation.

The herbicidal formulation was diluted to a concentration of 0.6% (g/g), which is appropriate for commercial spray applications. Further dilutions were made from this stock solution. Ferric chloride hexahydrate was provided by FISHER and diluted to a 10% (g/g) solution on an anhydrous basis with distilled water. Aqueous hydrogen peroxide (30%) was provided by SIGMA-ALDRICH and was used as received.

Experiments were performed in the hood using 8 drachm (~30 ml) glass vials. Reagents were added to the vials in the following order: dicamba solution, ferric chloride solution, and aqueous hydrogen peroxide. One milliliter samples were taken from each vial at 5, 15, 30, 60, and 120 minute intervals and placed into HPLC vials containing a 10% solution of N-(phosphonomethyl)iminodiacetic acid (PMIDA). The PMIDA quenched the reaction by rapidly chelating iron and preventing it from degrading peroxide. The amount of PMIDA solution in each vial was calculated such that the sum of the moles of glyphosate and PMIDA were a 10% excess of the moles of iron present.

Samples were analyzed using ion chromatography coupled with mass spectroscopy (IC/MS/MS) to determine the dicamba concentration with time. Results were reported on a mass basis in parts-per-million (ppm) of the sample.

Tables 5-7 summarize the experiments designed for analyzing the impact of initial iron, peroxide, and dicamba concentrations on dicamba degradation rates.

TABLE 5

Reagent amounts for experiments looking at the effect of
initial iron concentration on dicamba degradation rate.

| Sample ID | Dicamba, mg/kg | Hydrogen Peroxide, μL | 10% FeCl₃ Solution, μL | PMIDA in analytical vial, uL |
|---|---|---|---|---|
| 1.75XFe | 1493.5 | 1725 | 960 | 125 |
| 2XFe | 1493.5 | 1725 | 1097 | 125 |
| 2.5XFe | 1493.5 | 1725 | 1371 | 125 |
| 3XFe | 1493.5 | 1725 | 1645 | 125 |

TABLE 6

Reagent amounts for experiments looking at the effect of initial peroxide
concentration on dicamba degradation rate. (NBP 08615439)

| Sample ID | Dicamba, mg/kg | Hydrogen Peroxide, μL | Iron, μL | PMIDA in analytical vial, uL |
|---|---|---|---|---|
| 25XHOOH | 1500 | 350 | 2200 | 160 |
| 50XHOOH | 1500 | 700 | 2200 | 160 |
| 75XHOOH | 1500 | 1050 | 2200 | 160 |
| 100XHOOH | 1500 | 1400 | 2200 | 160 |
| 125XHOOH | 1500 | 1750 | 2200 | 160 |

TABLE 7

Reagent amounts for experiments looking at the effect of initial
dicamba concentration on dicamba degradation rate.

| Sample ID | Dicamba, mg/kg | Hydrogen Peroxide, μL | Iron, μL | PMIDA in analytical vial, uL |
|---|---|---|---|---|
| D/1 | 6000 | 3466 | 4458 | 400 |
| D/2 | 3000 | 1733 | 2229 | 400 |
| D/4 | 1500 | 867 | 1115 | 400 |
| D/8 | 750 | 433 | 557 | 400 |
| D/16 | 375 | 217 | 279 | 400 |
| D0 | 0 | 867 | 1115 | 400 |

Example 5

Using data generated in connection with the experiments described in Example 4, reaction kinetics were calculated for degradation of dicamba in the presence of glyphosate. The results are generally consistent with first order kinetics for all of the reagents.

Figure 2:
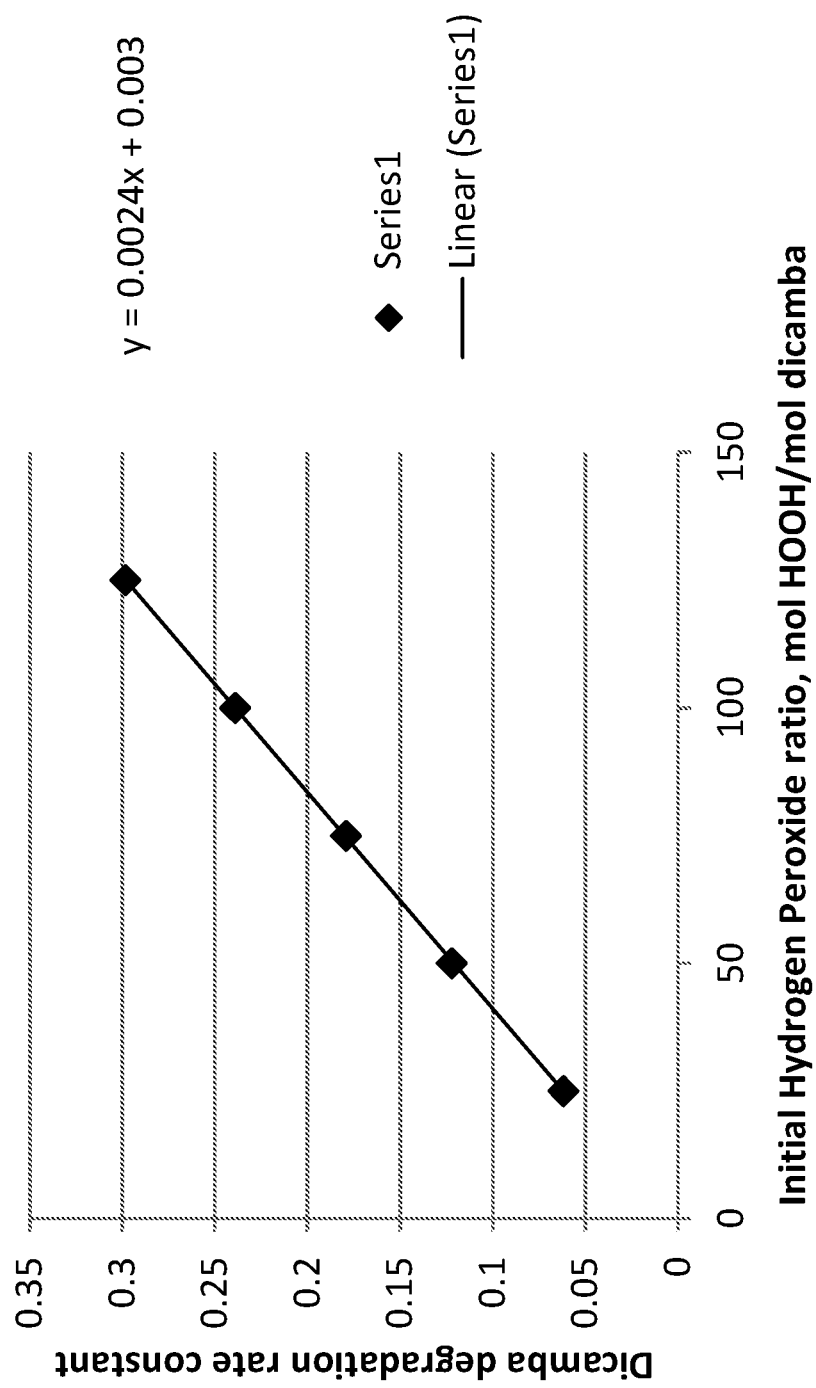
FIG. 2 is directed to the reaction rate constant as a function of initial hydrogen peroxide concentration as described in Example 5.
Figure 3:
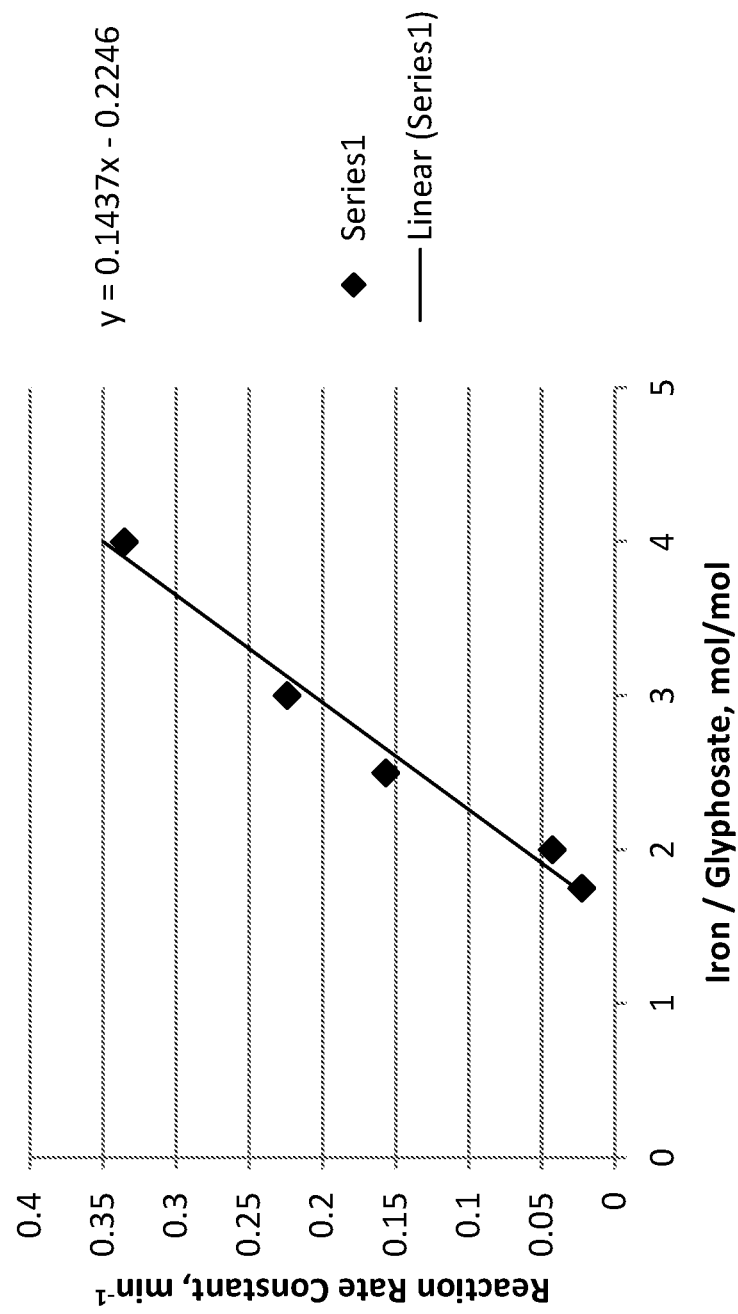
FIG. 3 is directed to the reaction rate constant as a function of the molar ratio of iron ions to glyphosate in the reaction mixture as described in Example 5.

For example, FIG. 1 shows the expected concentration of dicamba with respect to time on a logarithmic scale. The reaction rate constant (represented by the slope of the line) is not significantly impacted by the initial dicamba concentration, implying first-order behavior. FIG. 2 depicts the reaction rate constant as a function of initial hydrogen peroxide concentration. Generally, the data indicate that hydrogen peroxide has a first order effect on reaction rate. FIG. 3 depicts the reaction rate constant as a function of the iron to glyphosate molar ratio. Note that approximately 1.56 molar equivalents of iron are required to start the reaction in the presence of glyphosate. Also noteworthy is that the impact of increasing iron concentration is approximately 10 times greater than that achieved by increasing the concentration of hydrogen peroxide.

The reaction rate can reasonably be described by the equation below $$r_d = -\frac{d[D]}{dt} = k[F - F_0][P][D] \qquad (1)$$

Where D is the dicamba concentration in ppm, F is the molar ratio of total iron to glyphosate, and P is the peroxide concentration. From the kinetic data, $k=7.2 \times 10^{-7}$ min$^{-1}$ and $F_o$=1.56 mol iron/mol glyphosate. The rate equation is able to accurately fit the observations made in Examples 1-4 regarding changing peroxide and dicamba concentrations.

Example 6

The Fenton method, which was applied to degrade dicamba in Examples 1-4, was applied to 2,4-D to investigate whether this herbicide could also be degraded. The solutions set forth in Table 8, below, were prepared and placed in separate glass vials. The solutions were then analyzed by high performance liquid chromatography at 12 days following the first mixing. As shown in the table below, no dicamba or 2,4-D was detected in any of the samples comprising Fenton reagents.

TABLE 8

Analysis of dicamba and 2,4-D samples

| Sample # | 10% w/w Fe salt (μL) | 30% w/w H₂O₂ (μL) | 0.1% wt Clarity (g) | 0.1% wt 2,4-D amine (g) | Dicamba acid (% wt/vol), remaining after 12 days | 2,4-D (% wt/vol), remaining after 12 days |
|---|---|---|---|---|---|---|
| 08488968-1 (dicamba) | 0 | 0 | 30 | 0 | 0.1058 | ND |
| 08488968-2 (2,4-D) | 0 | 0 | 0 | 30 | ND | 0.1158 |
| 08488968-3 (dicamba/peroxide/FeCl₃) | 1050 | 1890 | 30 | 0 | ND | ND |
| 08488968-4 (dicamba/peroxide/FeCl₃) | 1050 | 1890 | 30 | 0 | ND | ND |
| 08488968-5 (dicamba/peroxide/FeCl₃) | 1050 | 1890 | 30 | 0 | ND | ND |
| 08488968-6 (2,4-D/peroxide/FeCl₃) | 1050 | 1890 | 0 | 30 | ND | ND |
| 08488968-7 (2,4-D/peroxide/FeCl₃) | 1050 | 1890 | 0 | 30 | ND | ND |
| 08488968-8 (2,4-D/peroxide/FeCl₃) | 1050 | 1890 | 0 | 30 | ND | ND |

Example 7

The following tables represent exemplary formulations, applications, and environmental conditions of the compositions and methods described herein. Unless otherwise noted, all values pertain to the cleaning of a full size spray tank with a capacity of 26 gallons (approximately equivalent to 100 kilograms).

TABLE 9

| | | | |
|---|---|---|---|
| Dicamba Use Rate, lb/A | 0.01 | 0.25 | 0.5 |
| Glyphosate Use Rate, lb/A | 0.03 | 0.75 | 1.5 |
| $FeCl_3$, molar equivalent to glyphosate | 1 | 1.25 | 1.5 |
| Hydrogen Peroxide, molar eq. to dicamba | 25 | 50 | 100 |
| Temperature, C. | 15 | 25 | 35 |

TABLE 10

| | | | | | | |
|---|---|---|---|---|---|---|
| Dicamba Use Rate, lb/acre | 0.25 | 0.5 | 0.05 | 0.005 | 0.4518 | 2.56E−04 |
| Application Rate, gallons/acre | 10 | 10 | 10 | 10 | 10 | 10 |
| Dicamba Concentration, % (g/g) | 0.2998 | 0.5995 | 0.0600 | 0.0060 | 0.5417 | $3.069 \times 10^{-6}$ |
| Holdup Volume, gallons | 6 | 6 | 6 | 6 | 6 | 6 |
| Rinse Volume, gallons | 20 | 20 | 20 | 20 | 20 | 20 |
| Rinse 1 Dicamba Concentration, mg/kg | 691.75 | 1383.5 | 138.35 | 13.835 | 1250 | 0.70836 |

TABLE 11

| | | | | | | |
|---|---|---|---|---|---|---|
| Glyphosate Use Rate, lb/acre | 0.75 | 1.5 | 0.15 | 0.015 | 1.355 | 1 |
| Application Rate, gallons/acre | 10 | 10 | 10 | 10 | 10 | 10 |
| Glyphosate Concentration, % (g/g) | 0.899 | 1.799 | 0.180 | 0.018 | 1.625 | 1.199 |
| Holdup Volume, gallons | 6 | 6 | 6 | 6 | 6 | 6 |
| Rinse Volume, gallons | 20 | 20 | 20 | 20 | 20 | 20 |
| Rinse 1 Dicamba Concentration, mg/kg | 2075.3 | 4150.5 | 415.05 | 41.505 | 3750 | 2767.02 |

Tables 12A and 12B generally relate to an application of the present method to clean a full size spray tank, wherein the source of transition metal ions is ferric chloride, and the source of hydrogen peroxide is aqueous hydrogen peroxide. In addition to glyphosate acid, a relatively small amount N-(phosphonomethyl)iminodiacetic acid, an intermediate produced during the production of glyphosate that is present in some glyphosate formulations, was also incorporated into the test herbicidal mixture. The test mixture was also pH adjusted to approximately 4.0 using sodium hydroxide, as necessary.

TABLE 12A

| | |
|---|---|
| Dicamba, mg/kg | 1500 |
| Glyphosate, mg/kg | 3035.16 |
| $FeCl_3$ Basis Amount, mol/mol glyphosate | 1.3 |
| $H_2O_2$ Basis Amount, mol/mol dicamba | 25 |

TABLE 12B

| Component | Amount (uL) | Density (mg/ul) | Mass Frac. | Amount (mg) | MW (g/mol) | Amount (mmol) | Conc. (mol/L) | Conc. (mg/kg) |
|---|---|---|---|---|---|---|---|---|
| Dicamba acid | 30000 | 1 | 0.0015 | 45 | 221.04 | 0.20 | 0.01 | 1456 |
| Glyphosate acid | 30000 | 1 | 0.003 | 91.05 | 169.07 | 0.54 | 0.02 | 2946 |

TABLE 12B-continued

| Component | Amount (uL) | Density (mg/ul) | Mass Frac. | Amount (mg) | MW (g/mol) | Amount (mmol) | Conc. (mol/L) | Conc. (mg/kg) |
|---|---|---|---|---|---|---|---|---|
| $FeCl_3$ (10% soln) | 392 | 2.898 | 0.1 | 113.56 | 162.2 | 0.70 | 0.02 | 3674 |
| $H_2O_2$ (30% soln) | 520 | 1.11 | 0.3 | 173.12 | 34.015 | 5.09 | 0.16 | 5600 |
| Total | 30912 | | | 422.73 | | | | |
| PMIDA 10% (g/g) solution | 429 | 1 | 0.094 | 40.36 | 227.11 | 0.18 | 5.67E−03 | 1288 |

Tables 13A and 13B generally relate to an application of the present method to clean a full size spray tank, wherein the source of transition metal ions is ferrous sulfate, and the source of hydrogen peroxide is aqueous hydrogen peroxide.

TABLE 13A

| | |
|---|---|
| Dicamba Basis, mg/kg | 1250 |
| Glyphosate Basis, mg/kg | 3750 |
| $FeCl_3$ Basis Amount, uL | 50 |
| $H_2O_2$ Basis Amount, uL | 567 |

TABLE 13B

| Component | Amount (uL) | Density (mg/ul) | Mass Frac. | Amount (mg) | MW (g/mol) | Amount (mmol) | Conc. (mol/L) | Conc. (mg/kg) |
|---|---|---|---|---|---|---|---|---|
| Dicamba acid | 30000 | 1 | 0.0013 | 37.5 | 221.04 | 0.17 | $4.77 \times 10^{-3}$ | 1055 |
| Glyphosate acid | 30000 | 1 | 0.0038 | 112.5 | 169.07 | 0.67 | 0.02 | 3164 |
| $FeSO_4 \cdot 7H_2O$ (10% soln) | 3662 | 1.898 | 0.1 | 695.03 | 278.02 | 2.50 | 0.07 | 19550 |
| Hydrogen Peroxide (30% soln) | 1890 | 1.11 | 0.3 | 629.37 | 34.015 | 18.50 | 0.52 | 17703 |
| Total | 35552 | | | 1474.41 | | | | |

Tables 14A and 14B generally relate to an application of the present method to clean a full size spray tank, wherein the source of transition metal ions is ferric chloride, and the source of hydrogen peroxide is sodium perborate.

TABLE 14A

| | |
|---|---|
| Dicamba Basis, mg/kg | 1250 |
| Glyphosate Basis, mg/kg | 3750 |
| $FeCl_3$ Basis Amount, uL | 50 |
| $H_2O_2$ Basis Amount, uL | 567 |

TABLE 14B

| Component | Amount (uL) | Density (mg/ul) | Mass Frac. | Amount (mg) | MW (g/mol) | Amount (mmol) | Conc. (mol/L) | Conc. (mg/kg) |
|---|---|---|---|---|---|---|---|---|
| Dicamba acid | 30000 | 1 | 0.0013 | 37.5 | 221.04 | 0.17 | 0.01 | 1143 |
| Glyphosate acid | 30000 | 1 | 0.0038 | 112.5 | 169.07 | 0.67 | 0.02 | 3430 |
| $FeCl_3$ (10% soln) | 1400 | 2.898 | 0.1 | 405.72 | 162.2 | 2.50 | 0.08 | 12369 |
| Sodium Perborate (μg) | 1401 | 1.31 | 1 | 1835.57 | 100 | 18.36 | 0.56 | 55961 |
| Total | 32801 | | | 2391.29 | | | | |

Tables 15A and 15B generally relate to an application of the present method to clean a full size spray tank, wherein the source of transition metal ions is ferric chloride, and the source of hydrogen peroxide is aqueous hydrogen peroxide. In addition to glyphosate acid, a relatively small amount N-(phosphonomethyl)iminodiacetic acid, an intermediate produced during the production of glyphosate that is present in some glyphosate formulations, was also incorporated into the test herbicidal mixture. The test mixture was also pH adjusted to approximately 4.0 using sodium hydroxide.

TABLE 15A

| | |
|---|---|
| Dicamba, mg/kg | 1500 |
| Glyphosate, mg/kg | 3035.15625 |
| $FeCl_3$ Basis Amount, mol/mol glyphosate | 4 |
| $H_2O_2$ Basis Amount, mol/mol dicamba | 125 |

TABLE 15B

| Component | Amount (uL) | Density (mg/ul) | Mass Frac. | Amount (mg) | MW (g/mol) | Amount (mmol) | Conc. (mol/L) | Conc. (mg/kg) |
|---|---|---|---|---|---|---|---|---|
| Dicamba acid | 50000 | 1 | 0.0015 | 75 | 221.04 | 0.34 | $5.66 \times 10^{-3}$ | 1252 |
| Glyphosate acid | 50000 | 1 | 0.00303 | 151.757 | 169.07 | 0.90 | $1.50 \times 10^{-2}$ | 2533 |
| $FeCl_3$ (10% soln.) | 5573 | 1.045 | 0.1 | 582.37 | 162.2 | 3.59 | $5.99 \times 10^{-2}$ | 9721 |
| Hydrogen Peroxide (30% soln) | 4332 | 1.11 | 0.3 | 1,442.67 | 34.015 | 42.41 | 0.708 | 24083 |
| | | | | | | | | |
| Total | 59905 | | | 2251.79 | | | | |
| PMIDA 10% (g/g) soln. | 9542 | 1 | 0.094 | 896.96 | 227.11 | 3.95 | $5.69 \times 10^{-2}$ | 12916 |

Tables 16A and 16B generally relate to an application of the present method to clean a full size spray tank, wherein the source of transition metal ions is ferric chloride, and the source of hydrogen peroxide is aqueous hydrogen peroxide. In addition to glyphosate acid, a relatively small amount N-(phosphonomethyl)iminodiacetic acid, an intermediate produced during the production of glyphosate that is present in some glyphosate formulations, was also incorporated into the test herbicidal mixture. The test mixture was also pH adjusted to approximately 4.0 using sodium hydroxide.

TABLE 16A

| | |
|---|---|
| Dicamba, mg/kg | 1500 |
| Glyphosate, mg/kg | 3035.15625 |
| $FeCl_3$ Basis Amount, mol/mol glyphosate | 4 |
| $H_2O_2$ Basis Amount, mol/mol dicamba | 125 |

TABLE 16B

| Component | Amount (uL) | Density (mg/ul) | Mass Frac. | Amount (mg) | MW (g/mol) | Amount (mmol) | Conc. (mol/L) | Conc. (mg/kg) |
|---|---|---|---|---|---|---|---|---|
| Dicamba acid | 50000 | 1 | 0.0015 | 75 | 221.04 | 0.34 | $5.66 \times 10^{-3}$ | 1252 |
| Glyphosate acid | 50000 | 1 | $3.03 \times 10^{-3}$ | 151.757 | 169.07 | 0.90 | $1.50 \times 10^{-2}$ | 2533 |
| $FeCl_3$ (10% soln.) | 5573 | 1.045 | 0.1 | 582.37 | 162.2 | 3.59 | $5.99 \times 10^{-2}$ | 9721 |
| Hydrogen Peroxide (30% soln) | 4332 | 1.11 | 0.3 | 1442.67 | 34.015 | 42.41 | 0.708 | 24083 |
| | | | | | | | | |
| Total | 59905 | | | 2251.79 | | | | |
| PMIDA 10% (g/g) soln. | 9542 | 1 | 0.094 | 896.96 | 227.11 | 3.95 | $5.69 \times 10^{-2}$ | 12916 |

Example 8

This example describes a small-scale demonstration of the efficacy of the present invention in largely eliminating injury to soy due to residual levels of three herbicides: dicamba, 2,4-D and flumioxazin, all in the presence of glyphosate. Four simulated spray solutions were prepared. All of the solutions were prepared assuming a 10 gallon/acre spray rate with a glyphosate rate of 1.0 lb acid equivalent (a.e.) per acre (1120 g/ha). The source of the glyphosate was Roundup Powermax® herbicide. In addition, the spray solutions contained dicamba diglycolamine salt (Clarity®) or 2,4-D amine sometimes in combination with flumioxazin derived from Valor® herbicide.

60 ml of the simulated spray solutions were transferred to 250 ml beakers. A ferrous sulfate solution (10% iron) was added to each solution in an amount that provided 3 moles of iron per mole of glyphosate. 30 moles of hydrogen peroxide per mole of dicamba or 15 or 30 moles of hydrogen peroxide per mole of 2,4-D was then added. The flask was swirled and allowed to stand for 20 minutes. Oxygen evolution occurred with mild foaming.

Immediately after 20 minutes had elapsed, the treated solutions were diluted 30× and sprayed over glyphosate-tolerant soybeans at a 10 gallon per acre rate. As a control, untreated solution, was diluted 30× and sprayed at the same rate. Soybean injury was rated 7 days after spraying. Injury to soy was dramatically reduced in all cases.

TABLE 17

Treatment protocols and soy injury ratings for simulated tank cleaning

| Treatment No. | Glyphosate rate (g/ha) | Other herbicides | Rates (g/ha) | $H_2O_2$ ratio† | Injury untreated | Injury treated |
|---|---|---|---|---|---|---|
| 1 | 1120 | Dicamba | 560 | 30 | 26% | 4% |
| 3 | 1120 | Dicamba/flumi* | 560/107 | 30 | 28% | 7% |
| 4 | 1120 | 2,4-D | 1120 | 30 | 38% | 4% |
| 5 | 1120 | 2,4-D | 1120 | 15 | 38% | 3% |
| 6 | 1120 | 2,4-D/flumi* | 1120/107 | 30 | 24% | 4% |

*flumi = flumioxazin.
†Molar ratio of $H_2O_2$ to dicamba or 2,4-D.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A method of preparing a tank for use in connection with a second pesticide following use of the tank in connection with a first pesticide, the method comprising:

introducing a cleaning mixture into a tank containing a residual amount of the first pesticide, wherein the cleaning mixture comprises (a) a source of transition metal ions, and
(b) a source of hydrogen peroxide;

allowing the cleaning mixture to remain in the tank for a time sufficient to degrade at least a portion of the residual amount of the first pesticide, thereby forming a waste mixture comprising degradation products of the first pesticide; and removing the waste mixture from the tank, wherein:

the duration between introduction of the cleaning mixture into the tank and removal of the waste mixture from the tank is less than about 10 minutes;

at least about 95% by weight of the residual amount of the first pesticide has been degraded when the waste mixture is removed from the tank, wherein the degradation of the residual amount of the first pesticide does not utilize UV light and the degradation products of the residual amount of the first pesticide do not retain pesticidal activity;

wherein no pH adjusting agent is introduced into the tank after introduction of the cleaning mixture into the tank; and the molar ratio of hydrogen peroxide to first pesticide is from about 10:1 to about 60:1.

2. The method of claim 1 wherein the cleaning mixture further comprises water.

3. The method of claim 1 wherein the first pesticide comprises a first herbicide.

4. The method of claim 3 wherein the first herbicide comprises a water-soluble herbicide selected from the group consisting of acifluorfen, acrolein, amitrole, asulam, benazolin, bentazon, bialaphos, bromacil, bromoxynil, chlorambenc, hloroacetic acid, clopyralid, 2,4-D, 2,4-DB, dalapon, dicamba, dichlorprop, difenzoquat, endothall, fenac, fenoxaprop, flamprop, flumiclorac, flumioxazin, fluoroglycofen, flupropanate, fluroxypyr, fomesafen, fosamine, glufosinate, glyphosate, imazameth, imazamethabenz, imazamox, imazapic, imazapyr, imazaquin, imazethapyr, ioxynil, MCPA, MCPB, mecoprop, methylarsonic acid, naptalam, nonanoic acid, picloram, quinclorac, sulfamic acid, 2,3,6-TBA, TCA, triclopyr, and water-soluble salts or esters thereof.

5. The method of claim 4 wherein the first herbicide comprises an auxin herbicide.

6. The method of claim 1 wherein the first herbicide comprises a water-insoluble herbicide selected from the group consisting of acetochlor, aclonifen, alachlor, ametryn, amidosulfuron, anilofos, atrazine, azafenidin, azimsulfuron, benfluralin, benfuresate, bensulfuron-methyl, bensulide, benzfendizone, benzofenap, bromobutide, bromofenoxim, butachlor, butafenacil, butamifos, butralin, butroxydim, butylate, cafenstrole, carfentrazone-ethyl, carbetamide, chlorbromuron, chloridazon, chlorimuron-ethyl, chlorotoluron, chlornitrofen, chlorotoluron, chlorpropham, chlorsulfuron, chlorthal-dimethyl, chlorthiamid, cinidonethyl, cinmethylin, cinosulfuron, clethodim, clodinafop-propargyl, clomazone, clomeprop, cloransulam-methyl, cyanazine, cycloate, cyclosulfamuron, cycloxydim, cyhalofop-butyl, daimuron, desmedipham, desmetryn, dichlobenil, diclofop-methyl, diflufenican, dimefuron, dimepiperate, dimethachlor, dimethametryn, dimethenamid, dinitramine, dinoterb, diphenamid, dithiopyr, diuron, EPTC, esprocarb, ethalfluralin, ethametsulfuron-methyl, ethofumesate, ethoxysulfuron, etobenzanid, fenoxaprop-ethyl, fenuron, flamprop-methyl, flazasulfuron, fluazifop-butyl, fluazifop-P-butyl, fluazoate, fluchloralin, flumetsulam, flumiclorac-pentyl, flumioxazin, fluometuron, fluorochloridone, flupoxam, flurenol, fluridone, fluroxypyr-I-methylheptyl, flurtamone, fluthiacet-methyl, graminicides, halosulfuron, haloxyfop, hexazinone, imazosulfuron, indanofan, isoproturon, isouron, isoxaben, isoxaflutole, isoxapyrifop, lenacil, linuron, mefenacet, metamitron, metazachlor, methabenzthiazuron, methyldymron, metobenzuron, metobromuron, metolachlor, S-metolachlor, metosulam, metoxuron, metribuzin, metsulfuron, molinate, monolinuron, naproanilide, napropamide, neburon, nicosulfuron, norflurazon, orbencarb, oryzalin, oxadiargyl, oxadiazon, oxasulfuron, pebulate, pendimethalin, pentanochlor, pentoxazone, phenmedipham, piperophos, pretilachlor, primisulfuron, prodiamine, profluazol, prometon, prometryn, propachlor, propanil, propaquizafop, propazine, propham, propisochlor, propyzamide, prosulfocarb, prosulfuron, pyraflufen-ethyl, pyrazogyl, pyrazolynate, pyrazosulfuron-ethyl, pyrazoxyfen, pyri buticarb, pyridate, pyriminobac-methyl, quinclorac, quinmerac, quizalofop, quizalofop-P, rimsulfuron, sethoxydim, siduron, simazine, simetryn, sulcotrione, sulfentrazone, sulfometuron, sulfosulfuron, tebutam, tebuthiuron, tepraloxydim, terbacil, terbumeton, terbuthylazine, terbutryn, thenylchlor, thiazopyr, thidiazimin, thifensulfuron, thiobencarb, tiocarbazil, tralkoxydim, triallate, triasulfuron, tribenuron, trietazine, trifluralin, triflusulfuron and vernolate.

7. The method of claim 1 wherein the tank is a spray tank.

8. The method of claim 1 wherein the source of transition metal ions comprises a source of polyvalent iron ions.

9. The method of claim 8 wherein the polyvalent iron ions are derived from a source selected from the group consisting of ferric ammonium sulfate, ferric chloride, ferric oxide, ferric oxide hydrate, ferric sulfate, ferrous ammonium sulfate, ferrous oxide, ferrous sulfate, ferrous chloride, iron salts of di-, tri- and other polycarboxylic acids and mixtures thereof.

10. The method of claim 1 wherein the source of hydrogen peroxide is selected from the group consisting of sodium percarbonate, sodium perborate, and combinations thereof.

11. The method of claim 1 wherein the source of hydrogen peroxide is aqueous hydrogen peroxide.

12. The method of claim 1 wherein the duration between introduction of the cleaning mixture into the tank and removal of the waste mixture from the tank is less than about 5 minutes.

13. The method of claim 1 wherein the waste mixture is removed from the tank by spraying.

14. The method of claim 1 wherein at least about 99% by weight-of the residual amount of the first pesticide has been degraded when the waste mixture is removed from the tank.

15. The method of claim 1 further comprising a pre-rinse step prior to introducing the cleaning mixture into the tank, wherein the pre-rinse comprises introducing an aqueous medium into the tank to form a diluted pesticidal residue mixture comprising a portion of the first pesticide.

16. The method of claim 15 wherein the aqueous medium comprises water.

17. The method of claim 2 wherein water constitutes at least about 50% by weight of the cleaning mixture.

18. The method of claim 1 wherein the cleaning mixture is not subjected to an artificial light source while in the tank.

19. The method of claim 1 wherein the cleaning mixture is not subjected to an applied electric current while in the tank.

20. The method of claim 1, wherein the first pesticide and the second pesticide are the same.

21. The method of claim 1, wherein the first pesticide is dicamba.

22. The method of claim 1, wherein the first pesticide is 2,4-D.

23. The method of claim 1, wherein the first pesticide is glyphosate.

24. The method of claim 8 wherein the polyvalent iron ions are derived from a source selected from the group consisting of ferrous ammonium sulfate, ferrous oxide, ferrous sulfate, ferrous chloride, and mixtures thereof.

25. The method of claim 8 wherein the polyvalent irons are derived from ferrous sulfate.

* * * * *